United States Patent [19]

Shimanuki

[11] Patent Number: 4,929,035

[45] Date of Patent: May 29, 1990

[54] ANTI-LOCK CONTROL SYSTEM FOR MOTOR VEHICLES

[75] Inventor: Haruki Shimanuki, Kasukabe, Japan

[73] Assignee: Akebono Brake Industry Co. Ltd., Japan

[21] Appl. No.: 307,617

[22] Filed: Feb. 7, 1989

[30] Foreign Application Priority Data

Feb. 8, 1988 [JP] Japan ................................. 63-25705

[51] Int. Cl.$^5$ ............................................. B60T 8/62
[52] U.S. Cl. ................................... 303/106; 303/100; 364/426.02
[58] Field of Search ...................... 303/93, 95, 96, 100, 303/103, 106, 106, 108, 109; 364/426.01, 426.02; 188/181 C

[56] References Cited

U.S. PATENT DOCUMENTS

| | | | |
|---|---|---|---|
| 3,545,817 | 12/1970 | Yarber | 303/93 |
| 4,665,490 | 5/1987 | Masaki et al. | 303/100 X |
| 4,741,580 | 5/1988 | Matsubura et al. | 303/106 X |
| 4,762,375 | 8/1988 | Maki et al. | 303/103 X |
| 4,763,260 | 8/1988 | Sakuma et al. | 303/105 X |
| 4,769,753 | 8/1988 | Masaki et al. | 303/105 X |

FOREIGN PATENT DOCUMENTS

| | | | |
|---|---|---|---|
| 0133812 | 3/1985 | European Pat. Off. | 303/103 |
| 0035647 | 3/1985 | Japan | 303/106 |
| 0081261 | 4/1986 | Japan | 303/106 |
| 1054146 | 11/1983 | U.S.S.R. | 303/95 |

Primary Examiner—Duane A. Reger

[57] ABSTRACT

In an anti-lock control system for motor vehicle, the design is made such that the braking distance of the motor vehicle is prevented from being increased by excessive reduction of brake hydraulic pressure for a road surface of medium- or high friction coefficient, while at the same time the occurrence of vibration in the motor vehicle caused by excessive reduction of the brake hydraulic pressure is avoided.

4 Claims, 6 Drawing Sheets

PRESSURE REDUCTION PRIOD JUDGING ROUTINE

ANTI-LOCK CONTROL SYSTEM FOR MOTOR VEHICLES

BACKGROUND OF THE INVENTION

1. Field of the Invention

This invention relates to a novel and improved anti-lock control system for motor vehicles, which is operative to prevent the wheels of the motor vehicle from being locked during a braking operation of the motor vehicle.

2. Description of the Prior Art

Generally, with an anti-lock control system for motor vehicles, anti-lock control is effected by means of microcomputers such that hold valves and decay valves comprising electromagnetic valves are opened and closed on the basis of electrical signals representing wheel speeds sensed by wheel speed sensors, thereby increasing, holding or reducing the brake hydraulic pressure, for the purpose of securing improved steering performance and running stability of the motor vehicle, while at the same time shortening the braking distance.

Figure 1:
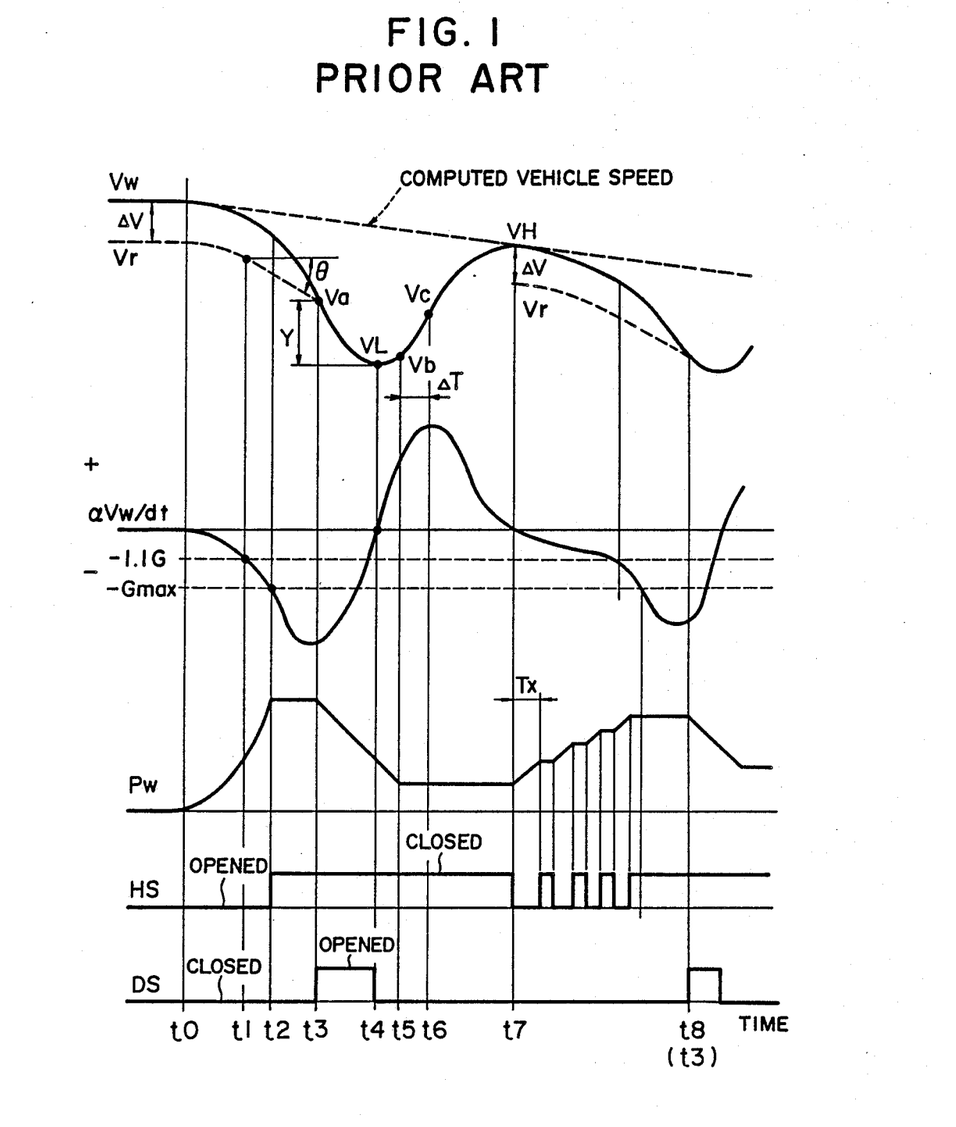
FIGS. 1 and 2 are views useful for explaining the prior-art anti-lock system for motor vehicles.

FIG. 1 of the accompanying drawings illustrates, by way of example, ways in which the wheel speed Vw, wheel acceleration and deceleration dVw/dt and brake hydraulic pressure Pw are varied during the operation of the conventional anti-lock control system, together with hold signal HS and decay signal DS for opening and closing the hold valves and decay valves, as disclosed in U.S. Pat. No. 4,741,580.

When the brake equipment of the motor vehicle is not being operated while the motor vehicle is running, the hold valves remain open while the decay valves remain closed, the brake hydraulic pressure Pw is not increased; and when the brake equipment is operated, the brake hydraulic pressure Pw is rapidly increased at time t0 so that the wheel speed Vw is decreased (normal mode). A reference wheel speed Vr is set up which is lower by a predetermined amount $\Delta V$ than the wheel speed Vw and follows the latter with such a speed difference. More specifically, the reference wheel speed Vr is set up so that when the deceleration (negative acceleration) dVw/dt of the wheel reaches a predetermined threshold level, say $-1.1G$ at time t1, an anti-lock control is started, and the reference wheel speed Vr is thereafter made to decrease linearly with a deceleration gradient $\theta$ ($=-1.1G$). At time t2 when the deceleration dVw/dt of the wheel reaches a predetermined maximum value $-G_{max}$, a hold signal HS is generated so that the hold valves are closed, thus holding the brake hydraulic pressure Pw.

While the brake hydraulic pressure Pw is being held constant, the wheel speed Vw is further decreased. At time t3, the wheel speed Vw and the reference wheel speed Vr become equal to each other, and a first cycle of anti-lock control is started; and a decay signal DS is generated, by which the decay valves are opened so that a reduction of the brake hydraulic pressure Pw is started. As a result of this reduction of the brake hydraulic pressure Pw, the wheel speed Vw is changed from increase to decrease at time t4 when a low peak VL of the wheel speed Vw occurs. At time t4, the decay signal DS is interrupted as shown in FIG. 1, and as a result the decay valves are closed so that the reduction of the brake hydraulic pressure Pw is stopped and thus the brake hydraulic pressure is held constant. The wheel speed Vw is further increased up to the level of a speed Vc which is higher than the low peak speed VL by 80% of a difference Y between the wheel speed Va occurring at the time t3 when the reduction of the brake hydraulic pressure Pw was started and the low peak speed VL, i.e., $Vc = VL + 0.8Y$. Subsequently, at time t7, a high peak VH of the wheel speed Vw is reached; thereupon, the brake hydraulic pressure Pw is again increased. In this case, the buildup of the brake hydraulic pressure Pw is effected in such a manner that the brake hydraulic pressure Pw is alternately increased and held in succession by the fact that the hold signal HS is turned on and off minutely, i.e., with relatively short intervals so that the brake hydraulic pressure Pw is caused to build up gradually. In this way, the wheel speed Vw is decreased, and at time t8 (corresponding to the time t3), a second cycle of the mode for reduction of the brake hydraulic pressure occurs. The time period Tx of the initial brake hydraulic pressure buildup occurring at the time t7 is determined on the basis of calculation of the average acceleration $(Vc - Vb)/\Delta T$ over the time interval $\Delta T$ between the time t5 and wherein the time t6 (the average acceleration depends on the friction coefficient $\mu$ of the road surface), and the time period of the subsequent pressure holding or pressure buildup is determined on the basis of the acceleration or deceleration of the wheel which is detected immediately prior to the pressure holding or pressure buildup. The brake hydraulic pressure increasing, holding and reducing modes are effected in combination as mentioned above, and thus the wheel speed Vw can be controlled so that the vehicle speed can be decreased, while the wheels of the motor vehicle are prevented from being locked.

Figure 2:
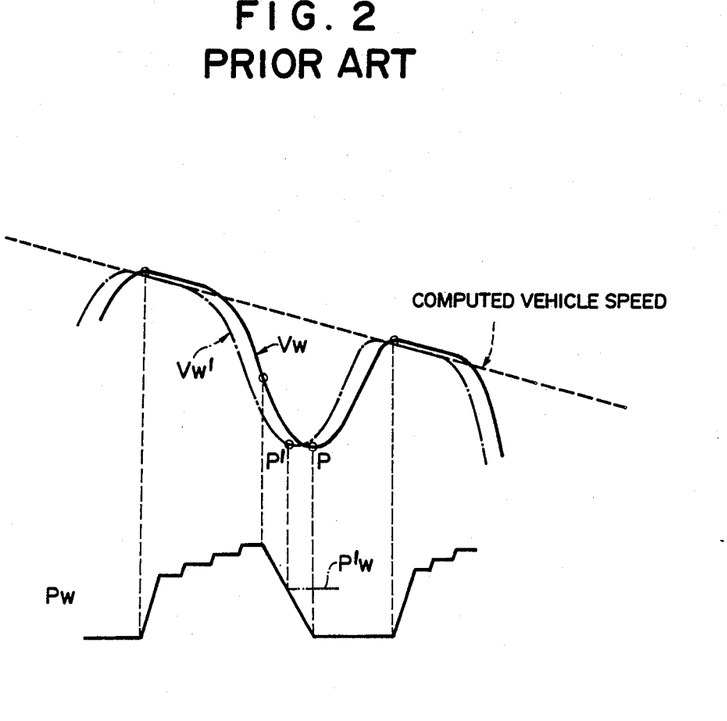

When the above-mentioned anti-lock control is effected, the wheel speed Vw which is used as a reference speed is computed on the basis of a frequency signal derived from a speed sensor provided in association with the wheel and is subjected to filtering in the range from $+30G$ to $-30G$ for example to prevent faulty operation due to noise. To compute the wheel speed Vw, a predetermined period of time is required so that the computed speed Vw shown by a solid line in FIG. 2 tends to be delayed by a certain time period say 10 to 16 ms with respect to the real wheel speed Vw' shown by a one-dotted chain line. Thus, ideally, the pressure reduction should be interrupted at a time point P' when a low peak of the real wheel speed Vw' occurs, and thereafter the brake hydraulic pressure should be held constant as shown by a one-dotted chain line Pw' in FIG. 2; actually, however, it is at a time point P which is later by a certain time period than the time point P' that the pressure reduction is interrupted so that the brake hydraulic pressure Pw is correspondingly further reduced. In general, the decreasing gradient of the brake hydraulic pressure as the anti-lock control is being effected is higher than the increasing gradient; thus, the brake hydraulic pressure is excessively reduced because of the delayed interruption of the pressure reduction. For a medium- or high-$\mu$ road surface representing a high friction coefficient $\mu$, difficulties are encountered in that due to the excessive reduction of the brake hydraulic pressure, the braking distance is increased, and also the variation range of the brake hydraulic pressure is so widened that a vibration is caused to occur in the motor vehicle.

SUMMARY OF THE INVENTION

Accordingly, it is an object of the present invention to provide an anti-lock control system for motor vehicle, which is so designed as to prevent the braking distance of the motor vehicle from being increased by an excessive reduction of brake hydraulic pressure for a medium- or high-$\mu$ road surface, while at the same time avoiding the occurrence of vibration in the motor vehicle which tends to be caused due to the excessive reduction of the brake hydraulic pressure.

To achieve the foregoing object, according to a first aspect of the present invention, there is provided an anti-lock control system, wherein a normal pressure reduction period for the brake hydraulic pressure is set up; and for a medium- or high-$\mu$ road surface, when the normal pressure reduction period elapses at a time point that is later than a time point when the pressure reduction is started but earlier than a time point when a low of wheel speed is reached, the pressure reduction is interrupted at the end of the normal pressure reduction period.

According to a second aspect of the present invention, there is provided an anti-lock control system, wherein a normal pressure reduction period is set up; a pressure reduction resuming threshold speed is set up which is lower than and follows, in a predetermined relation, a computed vehicle speed which is computed on the basis of the highest one of four wheel speeds; for a medium- or high-$\mu$ road surface, when the normal pressure reduction period elapses at a time point that is later than a time point when the reduction of brake hydraulic pressure is started but earlier than a time point when the wheel speed becomes equal to or lower than the pressure reduction resuming threshold speed, the pressure reduction is interrupted at the end of the normal pressure reduction periods. Furthermore, when the wheel speed becomes equal to or lower than the pressure reduction resuming threshold speed at a time point that is later than time point when the pressure reduction is interrupted but earlier than a low peak of the wheel speed is reached, pressure reduction is resumed at a time point when the wheel speed becomes equal to the pressure reduction resuming threshold speed, and continued until the time point when the low peak of the wheel speed is reached.

As will be appreciated from what has been described above, according to the present invention, a normal pressure reduction period for a a medium- or high-$\mu$ road surface is set up; for such a road surface, the pressure reduction of brake hydraulic pressure is interrupted at a time point when the normal pressure reduction period elapses, so that an excessive reduction of the brake hydraulic pressure is prevented, thereby making it possible to shorten the braking distance. It is also possible to avoid the occurrence of vibration in the motor vehicle which tends to be caused by such excessive reduction of the brake hydraulic pressure.

Further, according to the present invention, a pressure reduction resuming threshold speed is set up, and the control is effected in such a manner that a pressure reduction is always effected when the wheel speed is lower than the pressure reduction resuming threshold speed so that even when rapidly falling, the wheel speed can be recovered from a falling state, thereby making it possible to prevent the wheel from being locked.

Other objects, features and advantages of the present invention will become apparent from the ensuing description taken in conjunction with the accompanying drawings.

DESCRIPTION OF THE PREFERRED EMBODIMENTS

The anti-lock system for motor vehicles according to an embodiment of the present invention will be described with reference to the accompanying drawings.

Figure 3:
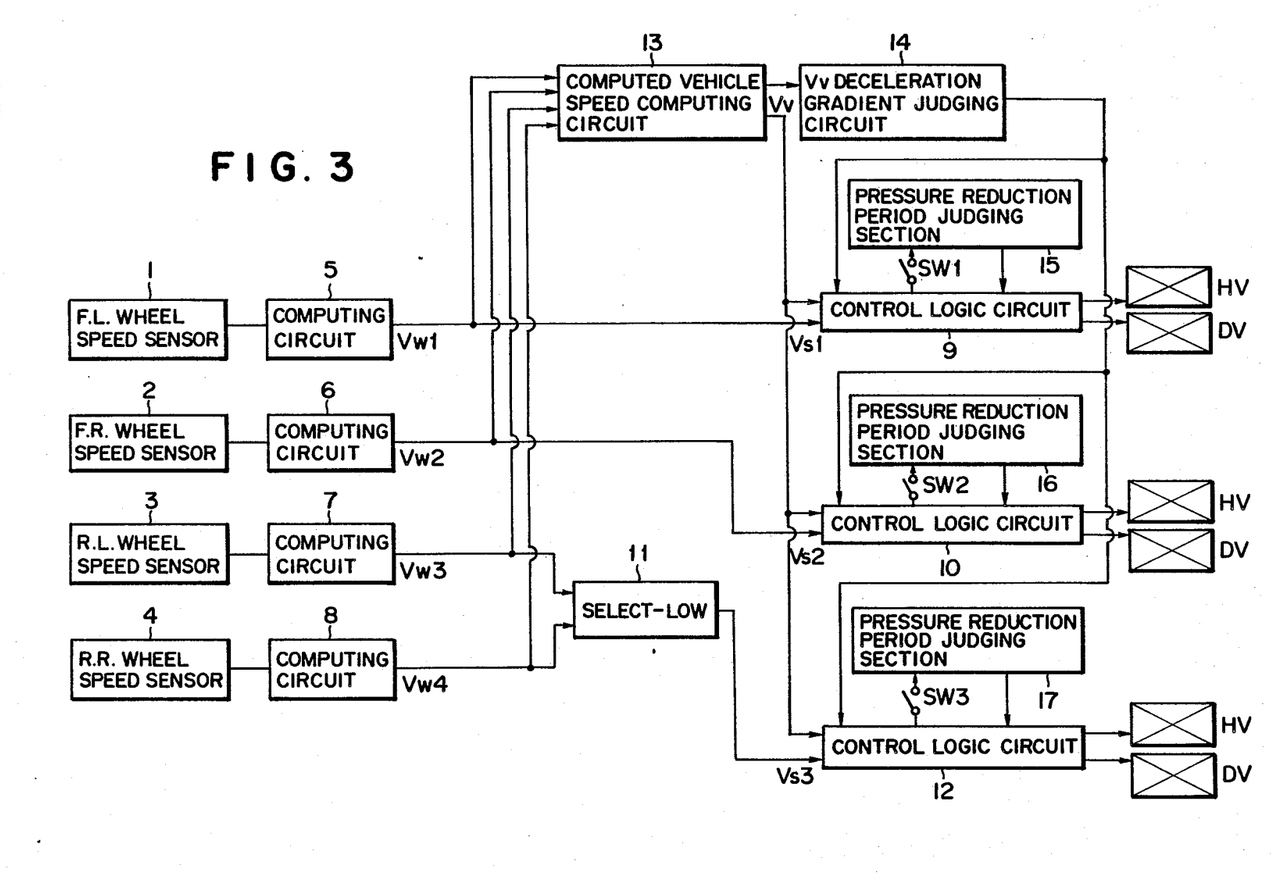
FIG. 3 is a block diagram showing the four-sensor, three-channel type anti-lock control system for motor vehicles according to an embodiment of the present invention.

Referring to FIG. 3, the block diagram shows a three-channel type anti-lock control system embodying the present invention, wherein the outputs of wheel speed sensors 1 to 4 are passed to and computed in computing circuits 5 to 8, from which signals representing wheel speeds Vw1 to Vw4 are derived. The lefthand front wheel speed Vw1 and the righthand front wheel speed Vw2 are respectively provided directly to a first and second control logic circuits 9 and 10 as first and second channel speeds Vs1 and Vs2. The lower one of lefthand rear wheel speed Vw3 and the righthand rear wheel speed Vw4 are selected by a select-low circuit 11 and are provided to a third control logic circuit 12 as a third channel speed Vs3. With the respective control logic circuits 9, 10 and 12, the opening/closing operation of hold valves HV and decay valves DV is controlled by using each of the channel speeds Vs1 and Vs3 as a control object wheel speed Vw which will be referred to as the wheel speed Vw hereinafter.

The respective signals representing the wheel speeds Vw1 to Vw4 are passed to a computing circuit 13 which in turn provides a computed vehicle speed. In the computing circuit 13, the highest one of the four wheel speeds Vw1 to Vw4 is selected and subjected to filtering of its acceleration and deceleration in a range from $+1G$ to $-1G$ so that the computed vehicle speed Vv is provided which in turn is passed to the control logic circuits 9, 10 and 12. The computed vehicle speed Vv is also provided to a deceleration gradient judging circuit 14. A signal representing the deceleration gradient judged by the circuit 14 is transmitted to the control logic circuits 9, 10 and 12. The deceleration gradient of the computed vehicle speed Vv represents the friction coefficient $\mu$ of the road surface. In this embodiment, the deceleration gradient value of the computed vehicle speed Vv corresponding to a lower limit value $\mu 1$ for the friction coefficient of a medium-$\mu$ road surface is set at 0.2G; and when the deceleration gradient is steeper than 0.2G, the road surface is judged as medium- or high-$\mu$ road surface.

For a first cycle of the anti-lock control process a judgment of the deceleration gradient of the computed vehicle speed Vv is made on the basis of the deceleration gradient which occurs during the time period from a time point when the anti-lock control is commenced to a time point when the subsequent buildup of the brake hydraulic pressure is started; and for second and succeeding cycles of the anti-lock control process, the judgment of the deceleration gradient is made on the basis of the deceleration which occurs during the time period from a time point when buildup of the brake hydraulic pressure is started to a time point when the next buildup of the brake hydraulic pressure is started.

The control logic circuits 9, 10 and 12 are respectively provided with pressure reduction period judging sections 15, 16 and 17 including switches SW1 to SW3 which are turned on, so that the judging sections 15 to 17 are operated, during the time period from a time point when pressure reduction is started to a time point when the pressure reduction is interrupted (when a low peak of the wheel speed Vw occurs), i.e., from time t3 to time t4 in FIG. 1.

Figure 4:
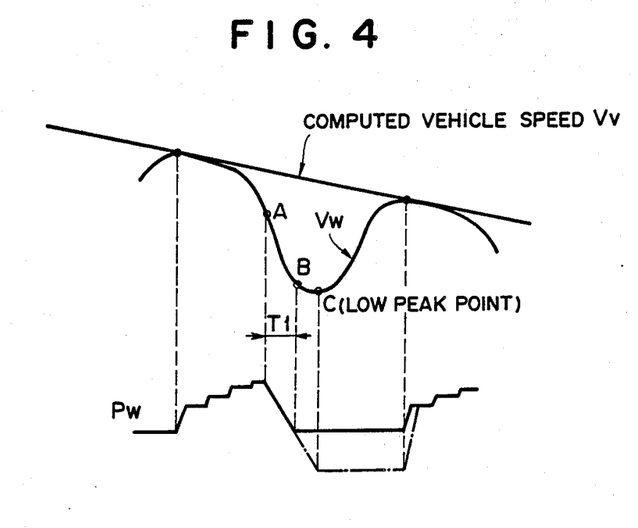
FIGS. 4 to 7 are views useful for explaining the relationship between the wheel speed and the brake hydraulic pressure that occurs in the system of the present invention.

In the pressure reduction period judging sections 15 to 17, a normal pressure reduction time T1 say 16 to 24 ms for the brake hydraulic pressure is set up; in the case where it is judged by the deceleration gradient judging circuit 14 that the deceleration gradient of the computed vehicle speed Vv is steeper than 0.2G, i.e., in the case where the road surface is judged as a medium- or high-$\mu$ road surface, the brake hydraulic pressure reduction is interrupted when the normal pressure reduction time T1 has elapsed at a time point B later than a time point A when the pressure reduction is started but earlier than a time point C when a low peak of the wheel speed Vw occurs, as shown in FIG. 4. With the conventional system, the pressure reduction is interrupted at the time point C as shown by one-dotted chain line in FIG. 4, whereas with the system of the present invention, as mentioned just above, the pressure reduction is interrupted at the time point B so that the brake hydraulic pressure is prevented from being excessively reduced for a medium- or high-$\mu$ road surface.

Further, in the normal pressure reduction period judging sections 15 to 17, a threshold speed VT1 for resuming pressure reduction is set up which is lower than and follows the computed vehicle speed Vv in a predetermined relationship therewith, in accordance with the following expression:

$$VT1 = a \times Vv - b$$

where a=0.75 to 0.95, and b=10 to 20 km/hour.

Figure 5:
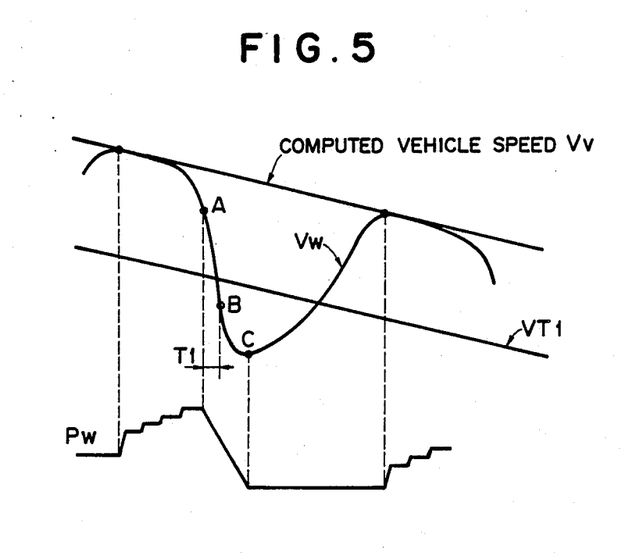

As shown in FIG. 5, when the wheel speed Vw has become lower than the pressure reduction resuming threshold speed VT1 before the normal pressure reduction time T1 elapses, the brake hydraulic pressure reduction is not interrupted at a time point B when the normal pressure reduction time T1 elapses from a time point A when the pressure reduction is started, and is continued until a low peak point is reached, thereby permitting the wheel speed Vw to be rapidly recovered from the falling state.

Figure 6:
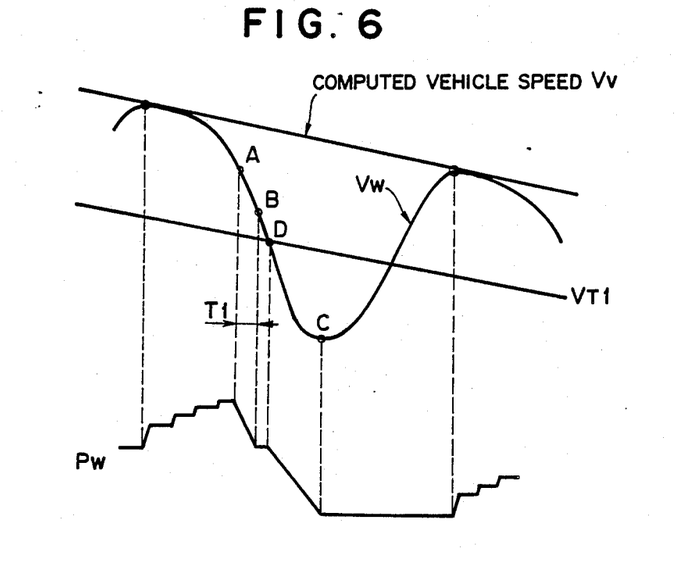

As shown in FIG. 6, even when the pressure reduction is interrupted at a time point B when the normal pressure reduction time T1 elapses from a pressure reduction starting time point A, the brake hydraulic pressure reduction which is started at a time point D when the wheel speed Vw has become lower than the pressure reduction resuming threshold speed VT1 before the wheel speed Vw reaches a low peak point C, and is continued until the low peak point C is reached, thereby permitting the wheel speed Vw to be recovered from the falling state.

Figure 7:
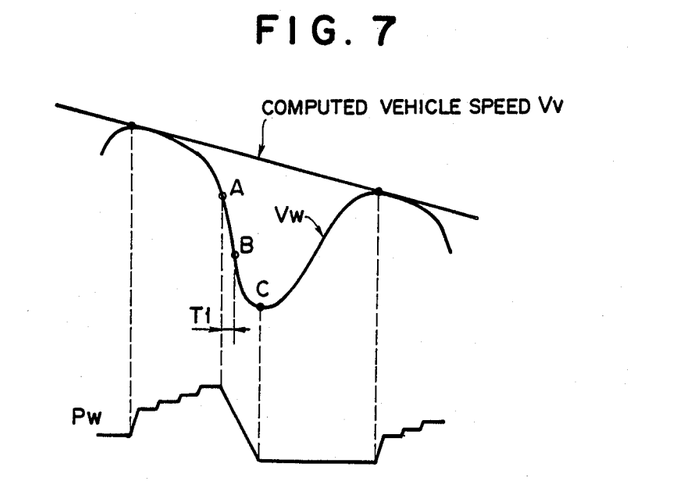

A computation is made of the average deceleration AVG of the wheel speed Vw which occurs during the time period from a time point A when pressure reduction is started to a time point B when the normal pressure reduction period T1 elapses. In the case where the average deceleration AVG is equal to or higher than 10G so that the wheel speed Vw is rapidly decreased as shown in FIG. 7, it is judged that the friction coefficient of the road surface is rapidly changed from medium- or high-$\mu$ to low-$\mu$, so that even when a condition for interruption of the pressure reduction is satisfied at the time point B, the brake hydraulic pressure reduction is not interrupted at the time point B but continued until and interrupted at a time point when a low peak of the wheel speed Vw occurs, thereby preventing the wheel from moving toward being locked.

Figure 8:
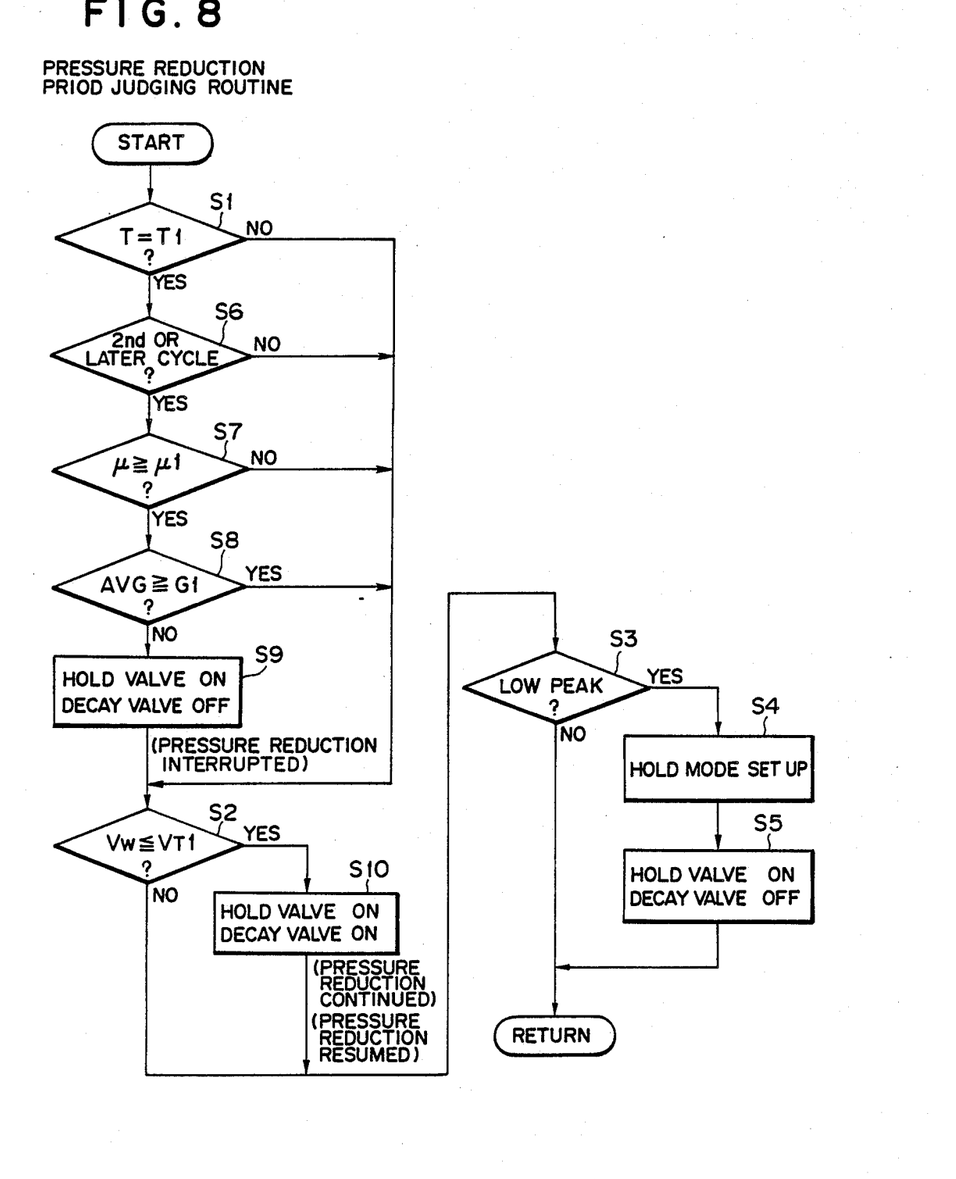
FIG. 8 is a flow chart of a pressure reduction period judging routine according to the present invention.

FIG. 8 is a flow chart showing a control routine executed by the pressure reduction period judging sections 15 to 17. At step S1, a judgment is made as to whether or not the normal pressure reduction period T1 elapses after the pressure reduction is started. The result of the judgment at the step S1 is "NO" until the normal pressure reduction period T1 elapses, and thus the process proceeds to step S2 where judgment is made as to whether or not the wheel speed Vw is lower than the the pressure reduction resuming threshold speed VT1. The result of the judgment at the step S2 is "NO" until the wheel speed Vw reaches the pressure reduction resuming threshold speed VT1, and thus the process proceeds to step S3 where a judgment is made as to whether or not a low peak of the wheel speed Vw is reached. The process returns to the step S1 until a low peak of the wheel speed Vw occurs. When such a low peak occurs, the result of the judgment at the step S3 is "YES", and a hold mode is established at step S2. At the next step S5, the decay valves are turned off (closed), while the hold valves remain turned on (closed), so that the pressure reduction is interrupted. When the result of the judgment at the step S3 is "NO", the process returns to the step S1.

The case where no low peak of the wheel speed Vw occurs until the normal pressure reduction period T1 elapses from a time point when the pressure reduction is started will now be described. When the result of the judgment at the step S1 is "YES", judgment is made at the next step S6 as to whether or not it is in the second or later cycle of the anti-lock control that the current pressure reduction is being effected. This is because the deceleration of the computed vehicle speed Vv cannot be judged until after the second or later cycle of the anti-lock control. When the result of the judgment at the step S6 is "YES" the process proceeds to the next step S7 where a judgment is made as to whether or not the friction coefficient of the road surface is equal to or higher than a lower limit value $\mu 1$ for the friction coefficient of a medium-$\mu$ road surface. This judgment is made through the judgment with respect to the deceleration of the computed vehicle speed Vv as described above. More specifically, the road surface is judged as medium- or high-$\mu$ road surface when the deceleration gradient of the computed vehicle speed Vv is steeper than 0.2G. At the next step S8, judgment is made as to whether or not the average deceleration AVG of the wheel speed Vw occurring during the time period from the pressure reduction starting point to the time point when the normal pressure reduction period T1 elapses, is equal to or higher than a predetermined value G1, say 10G. When the result of the judgment is "NO", the process proceeds to the next step S9 where while the hold valves remain turned on (closed), the decay valves are turned off (closed) to interrupt the pressure reduction; and thereafter the process proceeds to the step S2. When it is judged at the step S2 that the wheel speed Vw is lower than the pressure reduction resuming threshold speed VT1, the process proceeds to step S10 where while the hold valves remain turned on (closed), the decay valves are turned on (opened), so that the brake hydraulic pressure is reduced again. When it is judged at the next step S3 that a low peak of the wheel speed Vw occurs, a hold mode is established at step S4, and the pressure reduction is interrupted at step S5. When it is judged at the step S2 that the wheel speed Vw is not lower than the pressure reduction resuming threshold VT1, the process proceeds to step S3 while the pressure reduction remains interrupted. Further, when the result of the judgment at the step S6 or S7 is "NO", or when the result of the judgment at the step S8 is "YES", the pressure reduction is not interrupted, and the process proceeds to the step S2; when the result of the judgment at the step S2 indicates that Vw is equal to or lower than VT1, the process proceeds to step S10 so that the pressure reduction is continued until and interrupted at a time point when a low peak of the wheel speed Vw is reached.

In summary, in the anti-lock control system according to the above-described embodiment of the present invention, when the deceleration gradient of the computed vehicle speed Vv is steeper than 0.2G, the following modes of control are effected:

(1) If a low peak point C of the wheel speed Vw occurs before a time point B when the normal pressure reduction period T1 elapses, then the pressure reduction is interrupted at the low peak point C.

(2) If the time point when the normal pressure reduction period T1 elapses occurs before the low peak point C, then the pressure reduction is interrupted at the time point B (see FIG. 4). However, the pressure reduction is not interrupted at the time point B but continued until the low peak point C is reached, in each of the cases where:

(a) the wheel speed Vw becomes lower than the pressure reduction resuming threshold speed VT1 before the wheel speed Vw reaches the point B (see FIG. 5); and (b) the average deceleration of the wheel which occurs during the time period from the time point A to the time point B, becomes equal to or higher than 10G (see FIG. 7).

(3) When the wheel speed Vw becomes lower than the pressure reduction resuming threshold speed VT1 after the pressure reduction is interrupted at the time point B, the pressure reduction is resumed at a time point D when the wheel speed Vw reaches the pressure reduction resuming threshold speed VT1, and the pressure reduction is continued until the low peak point C is reached (see FIG. 6).

As will be appreciated from the above discussion, by effecting the above-described anti-lock control in accordance with the present invention, it is possible to prevent the braking distance of the motor vehicle from being increased by an excessive reduction of the brake hydraulic pressure for a medium- or high-$\mu$ road surface. It is also possible to avoid occurrence of vibration in the motor vehicle which tends to be caused by the fact that the amplitude of the pressure variation is increased as a result of the excessive reduction of the brake hydraulic pressure.

While the present invention has been illustrated and described with respect to specific embodiments of the present invention, it is to be understood that the invention is by no means limited thereto but encompasses all changes and modifications which will become possible within the scope of the appended claims.

I claim:

1. An anti-lock control system for motor vehicles, wherein a low peak of a wheel speed is detected which occurs when the wheel speed as decreased by a pressure buildup of a brake hydraulic pressure is changed from decrease to increase by a pressure reduction of the brake hydraulic pressure, and said pressure reduction is interrupted at a time point when said low peak of the wheel speed is detected, said anti-lock control system comprising:

means for judging the friction coefficient of a road surface on which the motor vehicle runs;

means for setting up a normal pressure reduction period for the brake hydraulic pressure;

means arranged to interrupt said pressure reduction at the end of said normal pressure reduction period under such conditions that said friction coefficient is equal to or higher than a predetermined value and said normal pressure reduction period elapses before said low peak occurs;

means for computing a computed vehicle speed by selecting the highest one of four wheel speeds and limiting the deceleration and acceleration of the selected highest wheel speed to be in a predetermined range; and means for computing a pressure reduction resuming threshold speed which is lower than and follows said computed vehicle speed in a predetermined relationship therewith, wherein when said normal pressure reduction period elapses at a time point that is later than a time point when the pressure reduction is started but earlier than a time point when the wheel speed becomes lower than said pressure reduction resuming threshold, the interruption of the pressure reduction is effected at the end of said normal pressure reduction period; and when the wheel speed becomes lower than said pressure reduction resuming threshold speed after the pressure reduction has been interrupted, reduction of the brake hydraulic pressure is resumed at a time point when the wheel speed reaches said pressure reduction resuming threshold, and the pressure reduction is continued until a low peak of the wheel speed occurs.

2. An anti-lock control system according to claim 1, wherein said means for judging the friction coefficient of the road surface comprises means for judging a deceleration gradient of a computed vehicle speed.

3. An anti-lock system according to claim 2, wherein for a first cycle of the anti-lock control, the deceleration gradient of the computed vehicle speed judged by said deceleration gradient judging means is that that occurs during the time period from a time point when the anti-lock control is started to a time point when subsequent pressure reduction is started; and for a second or later cycle of the anti-lock control, said deceleration gradient is that that occurs during the time period from pressure reduction is started to a time point when subsequent pressure reduction is started.

4. An anti-lock control system according to claim 3, wherein said deceleration gradient judging means is arranged to judge that the friction coefficient of the road surface is equal to or higher than said predetermined value when the deceleration gradient of said computed vehicle speed is steeper than $-0.2G$.

* * * * *